United States Patent
Bratu et al.

(10) Patent No.: US 11,452,280 B2
(45) Date of Patent: Sep. 27, 2022

(54) SYSTEM AND METHOD FOR CONTROLLING FLUID DISTRIBUTION IN A WATER BASIN

(71) Applicants: Jason Bratu, Oakville (CA); Andrea Ma, Mississauga (CA); Ashton Lafford, Oakville (CA); Adi Chhetri, Mississauga (CA); Andrew Batek, Mississauga (CA); Connor Bosy, Oakville (CA); Sheil Patel, Burlington (CA); Graeme Dubroy-McArdle, Oakville (CA); Pamela C. Catricala, Campbellville (CA); John F. Catricala, Campbellville (CA)

(72) Inventors: Jason Bratu, Oakville (CA); Andrea Ma, Mississauga (CA); Ashton Lafford, Oakville (CA); Adi Chhetri, Mississauga (CA); Andrew Batek, Mississauga (CA); Connor Bosy, Oakville (CA); Sheil Patel, Burlington (CA); Graeme Dubroy-McArdle, Oakville (CA); Pamela C. Catricala, Campbellville (CA); John F. Catricala, Campbellville (CA)

( * ) Notice: Subject to any disclaimer, the term of this patent is extended or adjusted under 35 U.S.C. 154(b) by 416 days.

(21) Appl. No.: 16/593,737

(22) Filed: Oct. 4, 2019

(65) Prior Publication Data

US 2020/0029529 A1    Jan. 30, 2020

Related U.S. Application Data

(63) Continuation of application No. PCT/CA2018/050451, filed on Apr. 13, 2018.
(Continued)

(51) Int. Cl.
*A01K 7/06* (2006.01)
*H04W 4/80* (2018.01)
*A01K 11/00* (2006.01)

(52) U.S. Cl.
CPC .............. *A01K 7/06* (2013.01); *A01K 11/006* (2013.01); *H04W 4/80* (2018.02)

(58) Field of Classification Search
CPC .......... E03C 1/055; E03C 1/057; E03C 1/242; A61H 2003/0054; A61H 2003/0079;
(Continued)

(56) References Cited

U.S. PATENT DOCUMENTS 4,617,876 A    10/1986  Hayes
9,456,582 B2*  10/2016  Lamb ....................... A01K 1/10
(Continued)

OTHER PUBLICATIONS

Webster, S.; International Search Report from corresponding PCT Application No. PCT/CA2018/050451; search completed Jun. 5, 2018.

*Primary Examiner* — Joshua E Rodden
*Assistant Examiner* — Henry Hooper Mudd
(74) *Attorney, Agent, or Firm* — CPST Intellectual Property Inc.; Brett J. Slaney

(57) ABSTRACT

A system and method are provided that can detect the presence of a user such as a mammal (e.g., a horse), and fill a water basin to enable the user to consume the water. The system can detect consumption of the water in the basin and refill one or more times. After detecting that the user is no longer in the vicinity, any remaining water can be drained from the basin. In addition to detecting the presence of the user, an ID can be associated with certain users of the system to track water consumption and other metrics. This data can be gathered, stored, and provided to a server or service (e.g., in the cloud) to enable data to be logged, processed, ana-
(Continued)

lyzed and alerts, reports and notifications provided to entities that monitor the users, e.g., to track hydration of the users.

13 Claims, 7 Drawing Sheets

Related U.S. Application Data

(60) Provisional application No. 62/521,256, filed on Jun. 16, 2017, provisional application No. 62/484,988, filed on Apr. 13, 2017.

(58) Field of Classification Search
CPC ........... E21B 47/04; A01K 7/06; A01K 11/06; H04W 4/80
See application file for complete search history.

(56) References Cited

U.S. PATENT DOCUMENTS

| | | |
|---|---|---|
| 2005/0241589 A1 | 11/2005 | Forster |
| 2018/0125022 A1* | 5/2018 | Moran .................... A01G 27/00 |
| 2018/0216325 A1* | 8/2018 | Chen ......................... E03C 1/05 |
| 2019/0104890 A1* | 4/2019 | Braddock ................ A47K 3/00 |

* cited by examiner

SYSTEM AND METHOD FOR CONTROLLING FLUID DISTRIBUTION IN A WATER BASIN

CROSS-REFERENCE TO RELATED APPLICATION(S)

This application is a continuation of PCT Application No. PCT/CA2018/050451 filed on Apr. 13, 2018, which claims priority to U.S. Provisional Application No. 62/484,988 filed on Apr. 13, 2017, and U.S. Provisional Application No. 62/521,256 filed on Jun. 16, 2017, the contents of all applications being incorporated herein by reference.

TECHNICAL FIELD

The following relates to systems and method for controlling fluid distribution in a water basin, in particular for controlling filling, draining, and refilling operations for such a water basin.

BACKGROUND AND DESCRIPTION OF THE RELATED ART

Water is considered an extremely important nutrient in the equine diet. Without water, almost all of the horse's systems would cease to function. Some known benefits of having adequate water consumption in mammals such as horses include, without limitation: aiding in thermoregulation (maintenance of the horse's body temperature); lubricating the joints; helping to cushion the central nervous system; used in both sight and hearing; aiding in digestion; acting as a solvent for toxins and helping to eliminate them through urine and sweat; helping to maintain an elastic skin tone, etc.

To give another perspective on the importance of water, it may be noted that horses can survive without food for up to three weeks, but they can only survive without water for a maximum of five to six days. Although water intake varies according to the horse's exertion level, the ambient temperature, the components of his/her diet, and whether or not the animal is pregnant or lactating, the average 1,000-pound horse is found to need a minimum of three to eight gallons of water per day to function at a maintenance level.

When water intake is restricted, a horse can quickly become dehydrated. This can occur for several reasons, including whether or not sufficient quantities of water are made available, the horse finds it difficult to drink or swallow (for example, if he/she is suffering from a broken jaw or any of a number of diseases), or the available water isn't very palatable. It has been found that within 24 hours of water deprivation, a horse can lose about 4% of his/her body weight. After 48 hours without water, 6.8% of his/her body weight can be lost, and after 72 hours this number can increase to about 9%. If summer heat is factored in, this number can increase significantly, up to 16%.

The temperature, quality and cleanliness of the water are very important as well. Horses have been found to have preferences with the temperature of their water. Studies have shown that if a horse could choose between warm water and icy cold water, the horse would drink the cold water. However, the horse drinks less cold water compared to warm water when they don't have a choice between the two. This is not extremely detrimental, however, it normally affects the horse's water consumption.

More specifically, it has been considered that horses typically require about 1 L/20 kg of body weight per day. However, horses can drink too much water if it is available, and this can be caused by certain diseases. After about two days without water, veterinary help should be sought out, but after three to four days without water, irreversible organ damage can take place. Moreover, a horse's water consumption may decrease based on food's moisture content. While there are many ways to check for dehydration, this can become burdensome, particularly for farms having several horses. Nevertheless, it has been recognized that for horse owners, the wellness of their horse(s) can typically be most readily measured by whether or not the horse is drinking water. The problem is that this is difficult to measure, especially in a multiple horse situation, and when the horses are kept outdoors.

Existing solutions that address horse (and other animal) hydration have not been found to work outdoors, can require constant monitoring by the owner of the horse, and are susceptible to freezing in a winter climate. Some existing solutions that attempt to address this problem rely on training the horses to use a refillable basin. This requires additional efforts during the training period.

It is an object of the following to address at least one of the above-noted disadvantages.

SUMMARY

A system and method are provided that can detect the presence of a user such as a mammal (e.g., a horse), and fill a water basin to enable the user to consume the water. The system can detect consumption of the water in the basin and refill one or more times. After detecting that the user is no longer in the vicinity, any remaining water can be drained from the basin.

In addition to detecting the presence of the user, an ID can be associated with certain users of the system to track water consumption and other metrics. This data can be gathered, stored, and provided to a server or service (e.g., in the cloud) to enable data to be logged, processed, analyzed and alerts, reports and notifications provided to entities that monitor the users, e.g., to track hydration of the users.

In one aspect, the user of the water basin is a mammal such as a horse, and the basin is provided in conjunction with a post that is placed in an outdoor setting with a water line fed to the post and the system controlling usage of the water source. To address issues with freezing, a water control sub-system can be placed below the frost line to ensure that any water left in the system is below that frost line, and to ensure that the control elements do not become frozen and inoperable. The water basin can be controlled by timing the water flow, or by using one or more basin sensors that detect certain water levels. The system can include a short-range communication capability such as RFID, Bluetooth, NFC, etc., that is able to detect the user, e.g., by interrogating a tag on the user. For example, an RFID reader in the system can interrogate a passive RFID tag worn in a harness of a horse or embedded or otherwise coupled to an area on the horse's body (e.g., in the snout).

In one aspect, there is provided a method of controlling fluid distribution in a water basin, the method comprising: detecting the presence of a user; controlling a first valve connected to a water source to fill the basin; detecting a filled condition and controlling the first valve to stop filling; if detecting a lower limit of water in the basin while the user is still present, controlling the first valve to fill the basin again; and if detecting that the user is no longer present, controlling a second valve to drain any remaining water.

In another aspect, there is provided a system for controlling fluid distribution in a water basin, comprising: a control system for operating valves to control water entering and draining the water basin according to the above method; at least one sensor for determining a presence of a user and an identifier for the user; and at least one sensor for determining fill levels in the water basin.

BRIEF DESCRIPTION OF THE DRAWINGS

Embodiments will now be described by way of example only with reference to the appended drawings wherein.

DETAILED DESCRIPTION

Figure 1:
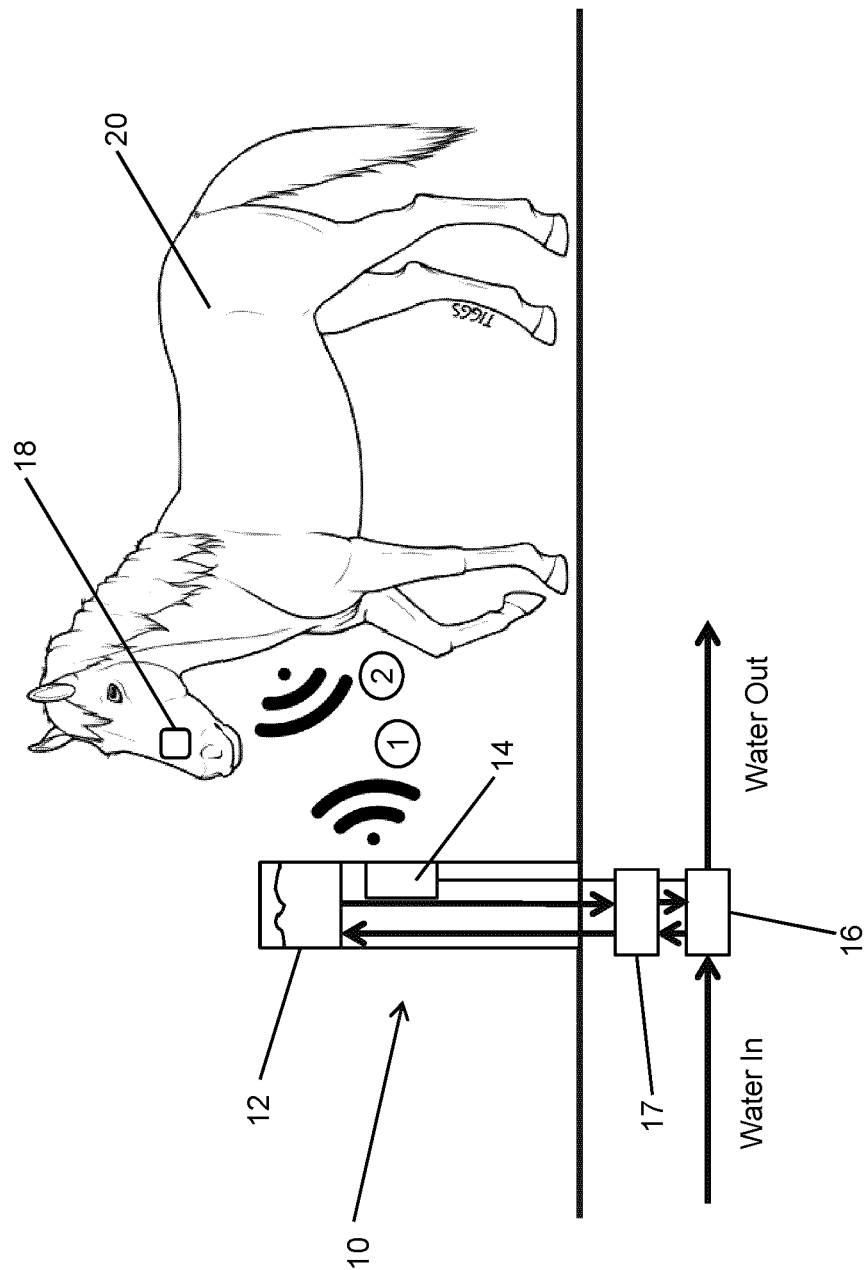
FIG. 1 is a schematic view of a watering post with a control system for distributing water through same, in an outdoor setting.

The following provides a horse watering post, which includes a water basin, a water flow control system, and a microcontroller or other processing technology integrated in the post to control water distribution into and out of the water basin. The system also includes a tag, e.g., on or embedded in the body or otherwise integrated into a halter or harness for a mammal being tracked, particularly horses. The following examples will be provided in the context of a watering post for horses, however, it will be appreciated that the principles can be applied to water basins used by any mammal.

Coupled to or embedded in the mammal's body, or integrated inside the halters are RFID passive tags, powerless chips that send data to a RFID reader when interrogated by the reader. When the horses come near the post, a sensor sends a message to a control module. The control module opens the water pipe valves, preferably placed below the frost line, forcing the water up the pipes, and filling the basin in the post. As the water gets pushed up into the basin, a flow meter can record how much water flowed into the basin. The control module can be programmed to refill the basin when the water sensors sense that the basin is empty (i.e. that the horse has finished the entire quantity in the basin) and that the horse is still present, yet the water is roughly halfway depleted. This can address the fact that a horse can be capable of drinking more than the capacity of the post in one sitting. When the horse has finished drinking, the time, horse ID, and the amount of water consumed can be recorded, and sent to an app. The app can be tied into a server and/or service that collects data from one or more posts and prepares reports, dashboards, alerts, etc.

The app can be programmed to have a list of the horses names, and how much water that they have been drinking. Notifications can be sent if the horse is not drinking enough for their body weight (i.e., should be about 1 L/20 kg, but a 450 kg horse can drink up to 30-40 L). Graphs can be made available demonstrating the horse's water consumption and times they visited the post. Notifications with advisory to see veterinarian can begin after day 2 without enough water. This addresses the fact that organ damage may begin after 3 days being dehydrated, whereas a single day can be an anomaly or not indicative of any major issue.

The posts can be made from any suitable material, e.g., PVC pipes that are 8 feet high, and 8 inches in diameter, with a basin capacity of about 3.5 L. Water can be sourced from a metered line installed below the frost line, particularly in colder climates. The control module is integrated into the post to enable operability of the short-range tracking subsystem such as an RFID reader. Complementary tags can be integrated into a harness or halter of the horse being monitored, to both detect the presence of a horse, but a particular horse to enable specific monitoring.

A system such as that described herein therefore does not require training of the horse to use, will not freeze, has a relatively low power usage, can be fully automated, can refill and drain automatically, can track the amount of water each individual horse consumes, can send the acquired information to an app, and can be used outdoors.

Turning now to the figures, FIG. 1 illustrates an example of an outdoor environment having a watering post 10 installed. The watering post 10 includes or otherwise supports a water basin 12. Water filled into the basin 12 or draining therefrom is controlled by a control system 14 that communicates with a water control sub-system 16, in this example being located beneath the ground, and a water measurement sub-system 17. The control system 14 includes a communication capability such as by having an RFID reader to detect the presence of a horse 20 at stage 1 by interrogating a tag 18 on the horse 20 and receiving data identifying that horse 20 at stage 2. While in the example shown in FIG. 1, the tag 18 is shown as being on or integrated into a nasal area of the horse 20, it can be appreciated that the tag 18 can instead be integrated into a harness or halter, or other item worn by the horse 20.

Figure 2A:
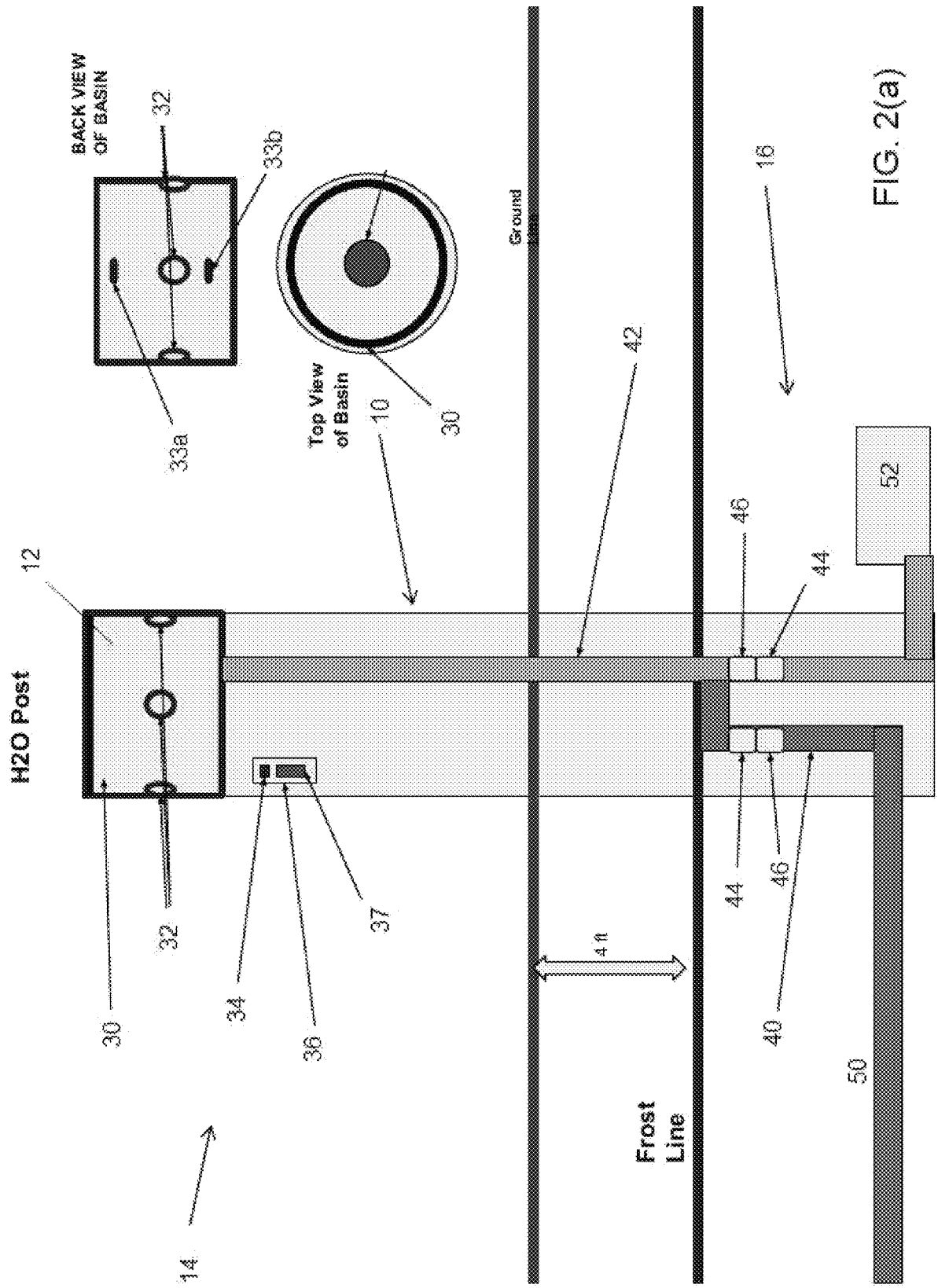
FIG. 2(a) is a schematic view of the control system and watering post according to a first embodiment of the invention.
Figure 2B:
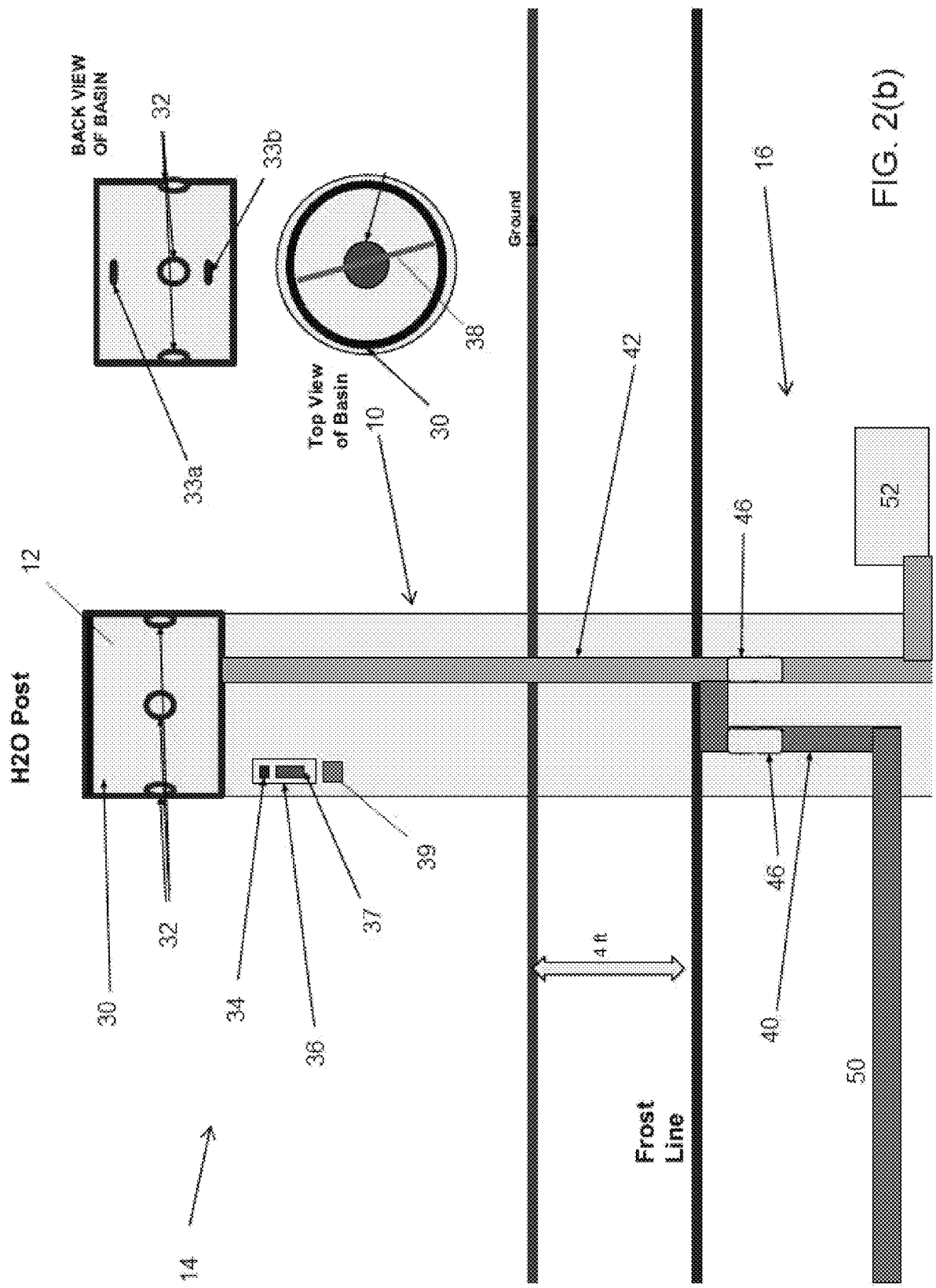
FIG. 2(b) is a schematic view of the control system and watering post according to a second embodiment of the invention.

Further detail regarding the water basin 12, the control system 14, and the water control sub-system 16 are illustrated in FIGS. 2(a) and 2(b). The post 10 is installed partially below the ground, in this example such that the water control sub-system 16 can be placed below the frost line. The post 10 includes an upper portion that forms the water basin 12, and houses or otherwise supports an RFID reader 30 (in this example a ring-shaped reader that encircles the basin 12), and the control system 14. The water basin 12 includes a number of sensors, in this example proximity sensors 32 positioned about halfway between full and empty lines, and conductivity probes 33 for full and empty fill lines. The RFID tagging technology is able to tell what horse is drinking from the post 10, and the proximity sensor(s) 32 are used to determine when a horse is in the vicinity of the post 10. The proximity sensor(s) 32 may be ultrasonic sensors, passive infrared sensors, or any other sensor capable of determining when a horse is in the vicinity of the post 10. The proximity sensor(s) 32 can be used to trigger the RFID reader 30 to transmit an RF signal to read the tag 18 on the horse 20. It can be appreciated that the ring-shaped reader 30 can read RFID tags in a multitude and preferably in all directions. Valves 46 are positioned to control the flow of water incoming from a city water line 50, and being drained, in this example to a gravel leaching bed 52.

The control system 14 can include one or more control modules 37 for interacting with the water system and the network, a door 36 for access to the circuit board, and a WiFi module 34 or other network interface to enable data to be provided externally to the post 10.

When the proximity sensor 32 detects something near it, the control system 14 can open the valve 46 and water flows into the basin 12. When the horse 20 bends down to drink, the RFID reader 30 can read the tag 18 in the horse's harness, and will recognize the horse that is drinking, based on an ID number associated with the tag 18. There are two water sensors 33, one at the top of the basin 33a, and one in the middle 33b. When the top sensor 33a is triggered, the water stops filling in the basin, to prevent overflow. The lower water probe 33b, located halfway up the basin identifies if the basin is half full, refilling the basin if the horse drinks past it, so the horse can drink more if/when desired. When the proximity sensor 32 does not detect the presence a horse any longer, the out valve 46 is opened, and the water flows out through the pipe.

The water measurement sub-system 17 is used to measure the amount of volume consumed when a horse 20 drinks from basin 12. In the example illustrated in FIG. 2(a), the water measurement sub-system 17 comprises flowmeters 44, positioned to calculate the flow of water incoming from a city water line 50, and being drained to a gravel leaching bed 52. When the valve 46 in the city water line 50 is opened, the flow meter 44 will calculate how much water travels into and through the city water line 50, into the basin 12. When the valve 46 in the out flow pipe 42 is opened to drain the basin 12, the out flow meter 44 reads how much water is flowing out. The control module 14 compares the amount of water that flowed into basin 12 to the amount of water that flowed out of basin 12 to find how much water the horse drank. The amount is recorded, is sent to a server or service to be provided to an app or website dashboard, etc.

In the example illustrated in FIG. 2(b), the water measurement subsystem 17 comprises an infrared break beam 38 and a timer 39. The infrared break beam 38 is positioned across the diameter of the basin 12, such that the beam 38 is broken by the horse 20 when it is drinking from the basin 12. The control system 14 is configured to start the timer 39 when the beam 38 is broken, indicating that the horse 20 is drinking from the basin 12, and pause when the beam 38 becomes unbroken, indicating that the horse 20 has stopped drinking. The time measured by timer 39 corresponds to the time that the horse 20 spends drinking from the basin 12, and may be used to calculate a volume of water consumed.

It should be appreciated that these examples are not meant to be limiting, and that the measurement subsystem 17 may use any other suitable method to measure the amount of water consumed by the horse 20.

Figure 3:
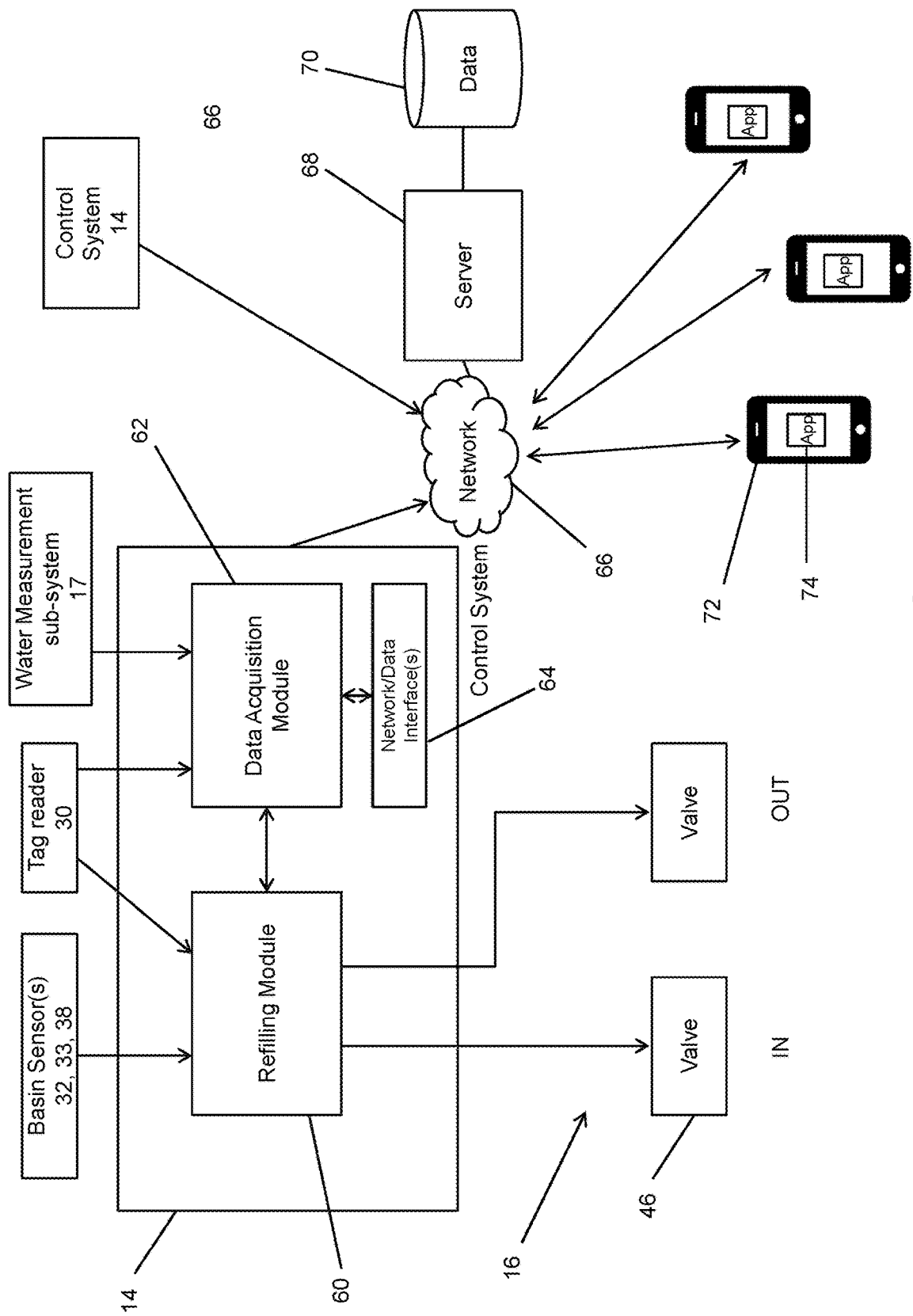
FIG. 3 is a block diagram showing an example of a configuration for the control system.

The data collected by the control system 14 can be used not only to control the filling and refilling of the water basin 12, but also to track data for one or more horses and to present this data to the horse's owner. Data from many subjects can also be stored and analyzed, e.g., by researchers, vets, etc. FIG. 3 illustrates an example of a wider system that can communicate with several control systems 14 used by corresponding posts 10. In this example, the control system 14 is programmed to include a refilling module 60 that uses data from the basin sensors 33, proximity sensors 32 and RFID tag reader 30 to control the valves 46 as described above in order to fill and drain the water basin 12. A data acquisition module 62 in this example is responsible for determining which horse is present via the tag reader 30, and by tracking the water consumption activity via the refilling module 60 and/or the water measurement subsystem 17, as described above. The data that is acquired, can be provided via one or more network interfaces 64 to a network 66. For example, the WiFi module 34 shown in FIG. 2, or a cellular connection, or manual hard disk can be used to convey data to a server 68 that stores the data in a data storage component 70. This data can be subsequently analyzed as noted above. Reports, notification, and/or the raw data can also be made available to users associated with the horses 20, such as their owners, using mobile device 72 having an app 74, or using other computing devices and web-based or application-based portals or dashboards.

Figure 4A:
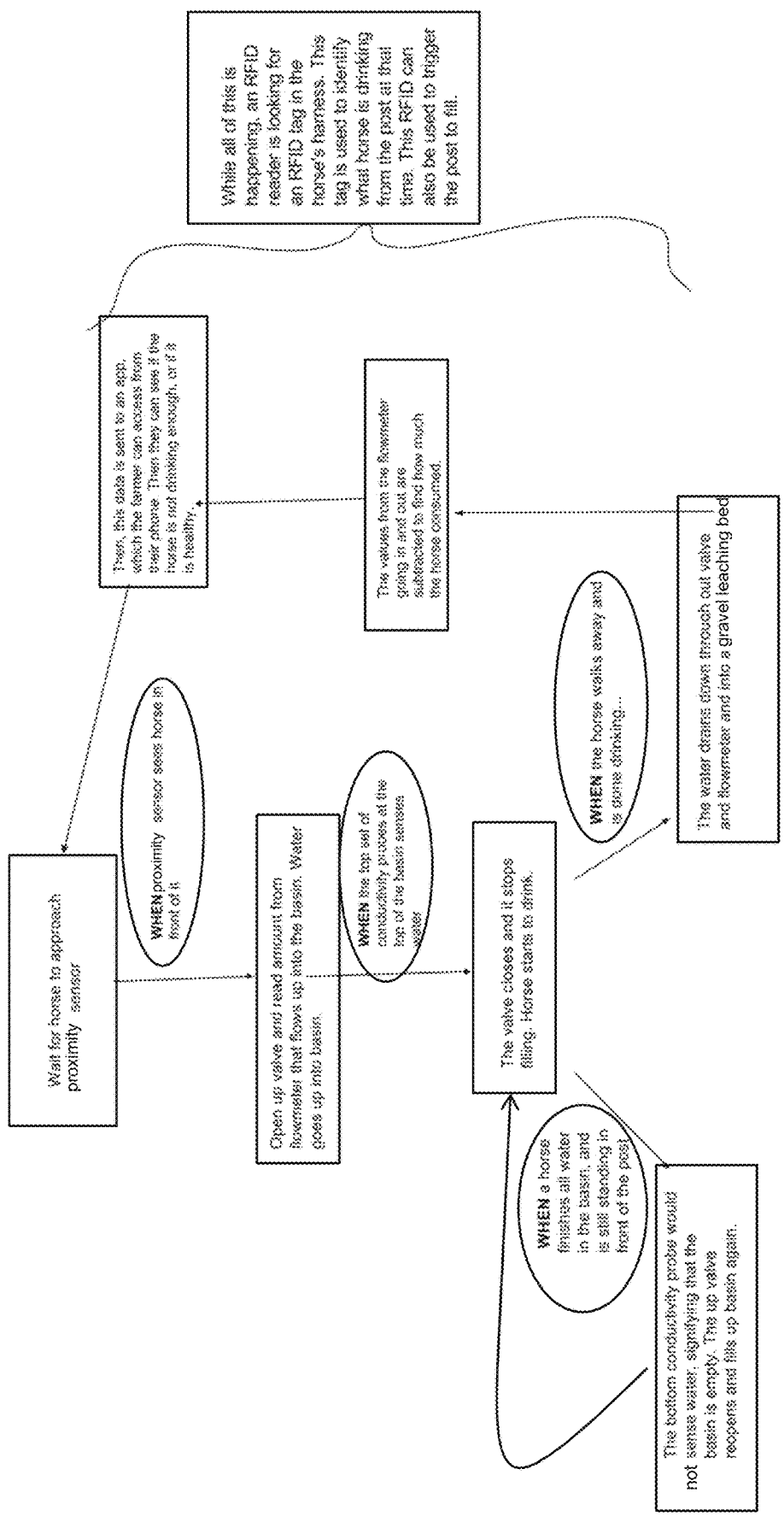
FIG. 4(a) is a flow chart illustrating operations performed in controlling the distribution of water in a water basin according to the first embodiment of the invention.
Figure 4B:
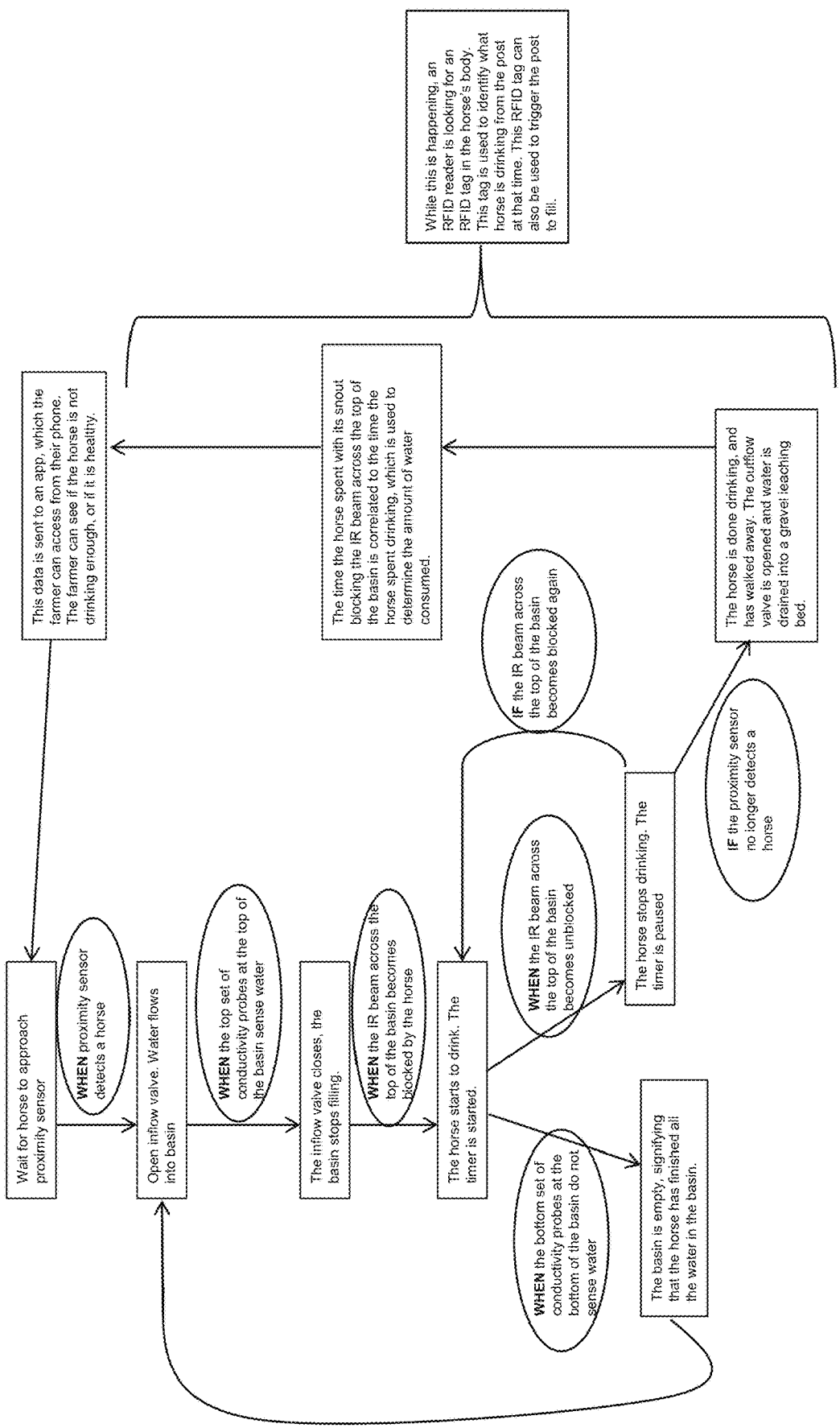
FIG. 4(b) is a flow chart illustrating operations performed in controlling the distribution of water in a water basin according to the second embodiment of the invention.

FIGS. 4(a) and 4(b) show flow charts illustrating operations that can be automated to control the provision of water through the water basin 12 on a post 10, where FIG. 4(a) corresponds to the example shown in FIG. 2(a) and FIG. 4(b) corresponds to the example shown in FIG. 2(b). The control system waits for a horse 20 to approach and detects this using the proximity sensors 32. When detected, the valve 46 is opened to permit water to flow into the water basin 12. When the water reaches the top conductivity probe 33, the valve 46 closes and stops filling the water basin 12. This allows the horse 20 to begin drinking. While drinking, if the horse continues drinking water in the water basin 12, and is still in the vicinity of the post 10, when the water level reaches the lower conductivity probes 33b, the valve 46 for the water supply opens again to refill the water basin 12 again. When the horse walks away from the post 10, this signifies that it is done drinking and the water drains through the gravel leaching bed 52 by opening the other valve 46 on the outlet side. The values captured by the water measurement sub-system 17 are used to determine an overall quantity of water consumed. This data is then stored and/or sent to the server 68 to be provided to the user's app 74. As noted in FIGS. 4(a) and 4(b), while this process is occurring, the RFID reader 30 can detect the RFID tag 18 on the horse 20 to identify the horse that is drinking to associate the hydration statistics with the horse that is currently using the water basin 12. This allows owners to track multiple horses 20.

Figure 5A:
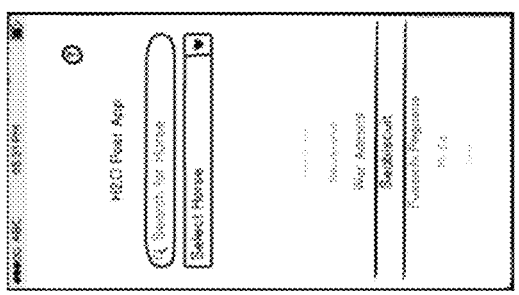
FIGS. 5(a) to 5(e) illustrate example screen shots of an app used to monitor use of one or more watering posts.
Figure 5B:
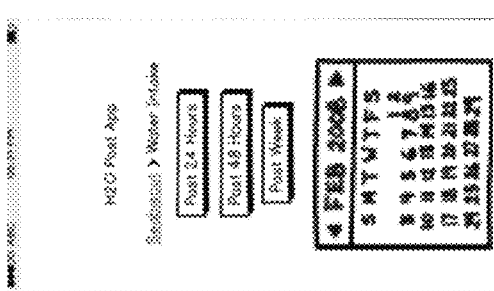
Figure 5C:
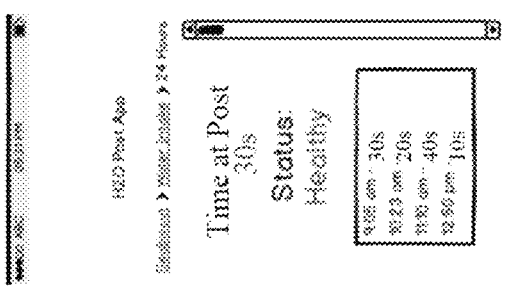
Figure 5D:
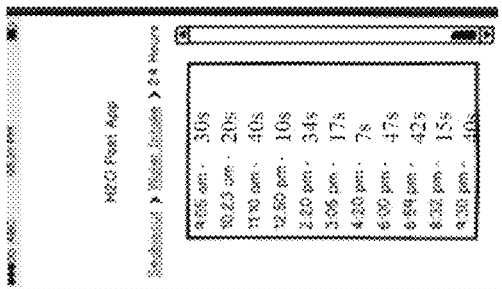
Figure 5E:
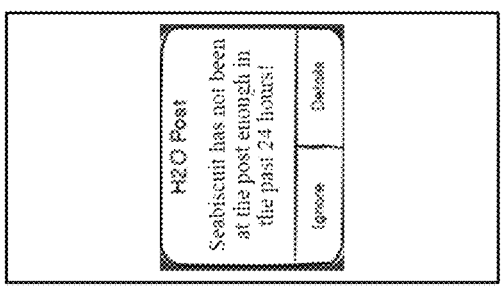

FIGS. 5(a) to 5(e) illustrate some example screen shots for an app 74 that can be connected to the watering post 10. FIG. 5(a) shows a screen where different horses can be selected, in order to obtain data about a specific horse, whether that horse drinks at one or more watering posts 10. FIG. 5(b) shows an example of a screen shot for a particular horse's water intake and can provide various options such as an ability to select particular days or wider time periods such as the past day, 2 days, week, etc. FIG. 5(c) illustrates an example of a screen showing data for a 24 hour period for the particular horse identified in FIG. 5(b), and FIG. 5(d) illustrates a listing of times spent (and thus inferring water consumed) at different times. FIG. 5(e) illustrates a notification screen that provides a message for a user, via the app 74, that the particular horse has not consumed enough water in the past 24 hours. Such messages can be used to alert a horse owner, trainer, or other caregiver or monitoring service to potentially take remedial action.

The system described herein therefore measures water intake by horses, uses RFID halters, proximity sensors, valves, and water measurement systems to provide the horses with water, can refill itself if the horse is still at the post and has drunk all the water, uses water measurement systems to measure the water consumed, uses a proximity sensor to detect if a horse is near the post, will not freeze because it is below the frost line, and sends the information to an app, e.g., to advise the owners to seek veterinary help after a 2 days without water.

Various problems were addressed in order to provide the solution described herein. For example, with respect to potential basin capacity issues, a horse drinks up to 40 L in a day, which can be many times what the post 10 may hold at one time. Since a horse typically drinks about 15 L at one sitting, or even up to 25 L, a 3 L capacity post would require 5 or more refill operations. The sensors described above were used to track when the water basin 12 becomes half full to begin refilling.

To address potential issues with activating the RFID sensor and thus begin filling, the proximity sensors 32 allow the system to detect when the horse 20 is near, and then begin reading the horse's identity while operating the water flow into the basin 12.

As noted above, to enable the post 10 to be used outdoors, even in cold sub-freezing climates, the water control subsystem 16 can be positioned below the frost line. This is connection with draining the water from the basin 12 at the appropriate time (i.e. when the horse 20 walks away), ensures that the basin 12 or pipes do not become frozen and keeps the valves 46 and flow meters 44 in working order.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the control module, any component of or related to the control module, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of controlling fluid distribution in a water basin, the method comprising:
   detecting the presence of a user and determining an ID for the user using a short-range communication protocol when the user is present;
   controlling a first valve connected to a water source to fill the basin;
   using at least one flow measuring device to determine a first amount of water added to the basin, detecting a filled condition, and controlling the first valve to stop filling;
   if detecting a lower limit of water in the basin while the user is still present, controlling the first valve to fill the basin again and using the at least one flow measuring device to determine an additional amount of water added to the basin;
   when detecting that the user is no longer present, controlling a second valve to drain any remaining water and using the at least one flow measuring device to determine a second amount of water leaving the basin; and
   outputting data determined from the at least one flow measuring device to provide an indication of an amount of water consumed for that user, the data based on or comprising the first amount, the second amount and, if applicable, the additional amount of water.

2. The method of claim 1, further comprising determining the amount of water consumed using the data, and wherein the data is provided to a server, service, or app.

3. The method of claim 1, wherein the short range communication protocol is RFID, and is triggered by a proximity sensor that detects the presence of the user.

4. The method of claim 1, wherein the filled condition and lower limit are detected using conductivity probes in the water basin.

5. A system for controlling fluid distribution in a water basin, comprising:
   at least one flow measuring device configured to determine amounts of water leaving and/or entering the basin; and
   a control system for reading the at least one flow measuring device and operating valves to control water entering and draining the water basin by executing instructions for:
   detecting the presence of a user and determining an ID for the user using a short-range communication protocol when the user is present;
   controlling a first valve of the operating valves connected to a water source to fill the basin;
   using at least one flow measuring device to determine a first amount of water added to the basin, detecting a filled condition, and controlling the first valve to stop filling;
   if detecting a lower limit of water in the basin while the user is still present, controlling the first valve to fill the basin again and using the at least one flow measuring device to determine an additional amount of water added to the basin;
   when detecting that the user is no longer present, controlling a second valve of the operating valves to drain any remaining water and using the at least one flow measuring device to determine a second amount of water leaving the basin; and outputting data determined from the at least one flow measuring device to provide an indication of an amount of water consumed for that user, the data based on or comprising the first amount, the second amount and, if applicable, the additional amount of water;

a communication interface to output the data;

at least one sensor for determining the presence of the user and the ID for the user using the short-range communication protocol; and at least one sensor for determining fill levels in the water basin.

6. The system of claim 5, further configured for determining the amount of water consumed using the data, and wherein the data is provided to a server, service, or app.

7. The system of claim 5, wherein the short range communication protocol is RFID, and is triggered by a proximity sensor that detects the presence of the user.

8. The system of claim 5, wherein the filled condition and lower limit are detected using conductivity probes in the water basin.

9. A non-transitory computer readable medium comprising computer executable instructions for controlling fluid distribution in a water basin, comprising instructions for:

detecting the presence of a user and determining an ID for the user using a short-range communication protocol when the user is present;

controlling a first valve connected to a water source to fill the basin;

using at least one flow measuring device to determine a first amount of water added to the basin, detecting a filled condition, and controlling the first valve to stop filling;

if detecting a lower limit of water in the basin while the user is still present, controlling the first valve to fill the basin again and using the at least one flow measuring device to determine an additional amount of water added to the basin;

when detecting that the user is no longer present, controlling a second valve to drain any remaining water and using the at least one flow measuring device to determine a second amount of water leaving the basin; and outputting data determined from the at least one flow measuring device to provide an indication of an amount of water consumed for that user, the data based on or comprising the first amount, the second amount and, if applicable, the additional amount of water.

10. The system of claim 5, further comprising the basin and a post, the post being coupled to a source of water and a drainage system, the post supporting the basin a distance from the ground.

11. The non-transitory computer readable medium of claim 9, further comprising determining the amount of water consumed using the data, and wherein the data is provided to a server, service, or app.

12. The non-transitory computer readable medium of claim 9, wherein the short range communication protocol is RFID, and is triggered by a proximity sensor that detects the presence of the user.

13. The non-transitory computer readable medium of claim 9, wherein the filled condition and lower limit are detected using conductivity probes in the water basin.

\* \* \* \* \*